United States Patent
Brewer et al.

(10) Patent No.: US 7,017,952 B2
(45) Date of Patent: Mar. 28, 2006

(54) FLUID CONNECTOR

(75) Inventors: Robert Brewer, Westland, MI (US); Gerard Jakuszeski, Oxford, MI (US)

(73) Assignee: MacLean-Fogg Company, Mundelein, IL (US)

( * ) Notice: Subject to any disclaimer, the term of this patent is extended or adjusted under 35 U.S.C. 154(b) by 410 days.

(21) Appl. No.: 10/177,310

(22) Filed: Jun. 21, 2002

(65) Prior Publication Data
US 2004/0007871 A1   Jan. 15, 2004

(51) Int. Cl.
*F16L 15/00* (2006.01)

(52) U.S. Cl. .................. 285/391; 285/13; 411/418; 411/437; 411/82

(58) Field of Classification Search ............. 285/391, 285/190, 332.4, 13; 411/418, 420, 421, 437, 411/436, 428, 82, 82.1, 258, 930
See application file for complete search history.

(56) References Cited

U.S. PATENT DOCUMENTS

| | | | |
|---|---|---|---|
| 1,015,059 A * | 1/1912 | Morgan ...................... 411/930 |
| 1,036,825 A * | 8/1912 | Garchey ..................... 411/421 |
| 1,799,941 A * | 4/1931 | Wulle ......................... 411/418 |
| 2,037,066 A | 4/1936 | Cook et al. |
| 2,223,202 A * | 11/1940 | Bergan ........................ 411/428 |
| 2,232,336 A * | 2/1941 | Meersteiner ................ 411/421 |
| 2,409,638 A | 10/1946 | Lyon |
| 2,884,038 A * | 4/1959 | Payne et al. ................ 411/82.1 |
| 2,913,031 A | 11/1959 | McKay et al. |
| 2,937,060 A | 5/1960 | Lachance |
| 3,822,902 A | 7/1974 | Maurer et al. |
| 4,599,172 A | 7/1986 | Gardes |
| 4,697,969 A * | 10/1987 | Sparkes ....................... 411/421 |
| 4,712,957 A | 12/1987 | Edwards et al. |
| 4,718,802 A * | 1/1988 | Rockenfeller et al. ....... 411/421 |
| 4,730,966 A | 3/1988 | Schiefer |
| 4,770,560 A | 9/1988 | Ott |
| 5,011,192 A | 4/1991 | Campo |
| 5,074,728 A | 12/1991 | Hsu |
| 5,211,551 A | 5/1993 | Uppal et al. |
| H1258 H | 12/1993 | Hindle, Jr. |
| 5,333,976 A * | 8/1994 | Dobbrunz ..................... 411/82 |
| 5,407,312 A | 4/1995 | Terrizzi |
| 5,452,977 A | 9/1995 | Terrizzi |
| 5,672,037 A * | 9/1997 | Iwata ........................... 411/436 |
| 5,702,445 A * | 12/1997 | Br.ang.nemark ............ 411/421 |
| 6,193,283 B1 | 2/2001 | Pickett, Jr. et al. |

FOREIGN PATENT DOCUMENTS

GB   2201216   *   8/1988   ................ 411/82

* cited by examiner

*Primary Examiner*—David Bochna
(74) *Attorney, Agent, or Firm*—Dana Andre Alden

(57) ABSTRACT

The present invention relates to a fluid connector, comprising a shaft having at least one solid shaft element and a plurality of connector surfaces, wherein the plurality of connector surfaces includes a surface with a plurality of threads and a plurality of grooves.

26 Claims, 6 Drawing Sheets

FLUID CONNECTOR

FIELD OF THE INVENTION

This invention relates to connectors for fluid distribution systems, and particularly to fluid connectors used to distribute fluids under pressure.

BACKGROUND OF THE INVENTION

Fluid connectors are known in the art and are referred to as "flow bolts" or "flow bolt assemblies." Such devices in the prior are typically fabricated with external threads and an internal cavity through which fluid flows. Examples of such flow bolts are shown in U.S. Pat. No. 5,011,192 to Campo, entitled "Bolt Retaining Hydraulic End Fitting Assembly." However, such flow bolts are weaker connectors because they are made with an internal cavity.

The present invention is directed to overcoming this and other disadvantages inherent in prior art systems.

SUMMARY OF THE INVENTION

The scope of the present invention is defined solely by the appended claims, and is not affected to any degree by the statements within this summary. Briefly stated, a fluid connector, comprising a shaft having at least one solid shaft element and a plurality of connector surfaces, wherein the plurality of connector surfaces includes a surface with a plurality of threads and a plurality of grooves.

DETAILED DESCRIPTION OF THE PRESENTLY PREFERRED EMBODIMENTS

Figure 1:
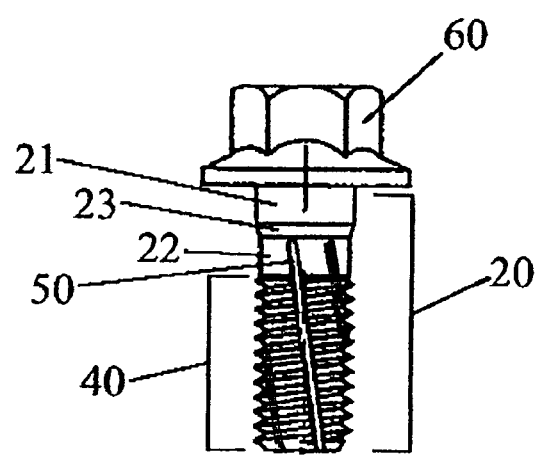
FIG. 1 depicts a preferred embodiment of a fluid connector.
Figure 2:
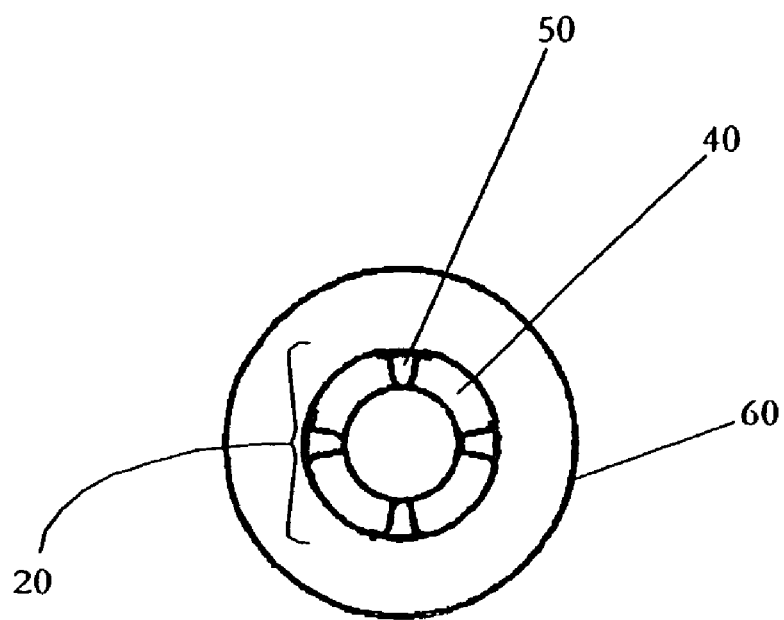
FIG. 2 depicts the bottom view of the preferred embodiment of a fluid connector seen in FIG. 1.

Turning now to the drawings, FIGS. 1 and 2 show a fluid connector 10 in the form of a flow bolt constituting a preferred embodiment of the present invention. The flow bolt 10 is composed of a metal, preferably aluminum. According to one aspect of the present invention, the metal is copper. According to another aspect of the present invention, the metal is iron.

Those skilled in the art will appreciate that the metal is an alloy. According to one aspect of the present invention, the metal includes ferrous and non-ferrous materials. According to another aspect of the present invention, the metal is a steel. Those skilled in the art mill appreciate that steel is in a plurality of formulations, such as stainless steel. According to one embodiment of the present invention the steel is a low carbon steel. In another embodiment of the present invention, the steel is a medium carbon steel. According to yet another embodiment of the present invention, the steel is a high carbon steel.

Those with skill in the art will also appreciate that the metal is a super alloy. According to one aspect of the present invention, the super alloy is bronze; according to another aspect of the present invention, the super alloy is a high nickel material. According to yet another aspect of the present invention, the flow bolt 10 is composed of martensitic material. According to still another aspect of the present invention, the flow bolt 10 is composed of austenitic material. According to another aspect of the present invention, the metal is a ferritic material.

The flow bolt 10 includes a shaft 20 and a head 60. The shaft 20 is composed of a plurality of shaft sections. According to one aspect of the present invention, a shaft cylindrical in shape. According to another aspect of the present invention, a shaft frusto-conical in shape. According to yet another aspect of the present invention, the shaft is solid. According to still another aspect of the present invention, the shaft is hollow.

FIG. 1 depicts the preferred embodiment of the present invention wherein the flow bolt shaft 20 is composed of a plurality of shaft sections 21, 22, 23 and 40. The shaft 20 includes an upper cylindrical shaft section 21, a lower cylindrical shaft section 22, an intermediate frusto-conical shaft section 23 and a threaded shaft section 40. In the preferred embodiment, the upper cylindrical shaft section 21 is joined to the lower cylindrical shaft section 22 via the frusto-conical shaft section 23.

The flow bolt shaft 20 of the present invention is provided with a plurality of connector surfaces. The cylindrical shaft section 22 has an unthreaded surface, as does the cylindrical shaft section 21. The cylindrical shaft 22 has a smaller diameter than the shaft section 21. The shaft section 40 below the shaft section 22 is externally threaded, as illustrated.

FIG. 1 depicts the preferred embodiment flow bolt 10 of the present invention. FIG. 2 depicts a bottom view of the preferred embodiment flow bolt 10 of the present invention. The lower cylindrical shaft section 22 and the externally threaded shaft section 40 have a plurality of grooves 50 formed into their outer surfaces and extending longitudinally from the frusto-conical section 23 to the free end of the threaded section 40. In the bolt 10 there are four such grooves 50 extending spirally and spaced 90° from each other around the shaft 20.

The connector surfaces of the present invention perform a plurality of functions. The threads of the section 40 function to fasten the fluid connector flow bolt 10 to another structure. This function is accomplished through the interaction of the threads and cooperating threads of another structure (not shown).

In use of the flow bolt 10, the grooves 50 function to channel fluid from around the section 22 of the shaft 20 to the free end of the shaft. This function is accomplished with at least one groove 50, although more are preferred, as illustrated here.

The flow bolt 10 is fabricated through a plurality of processes. According to one aspect of the present invention, the flow bolt 10 is machined. According to another aspect of the present invention, the flow bolt 10 is hot formed or forged. According to yet another aspect of the present invention, the flow bolt 10 is fabricated through casting. The preferred embodiment of the flow bolt is cold formed (also know as "cold head").

The process of cold forming the preferred embodiment begins with a metal wire or metal rod which is drawn to size. After being drawn to size, the wire or rod is upset by being run through a series of dies or extrusions. After the wire has been through a series of dies or extrusions, it has been changed to a semi-formed state. In this semi-formed state, the metal is rolled so that a surface with at least one groove 50 is formed. In the preferred embodiment, a plurality of grooves 50 are rolled into the shaft 20 so that they form spirals. Those skilled in the art will appreciate that a plurality of grooves 50 can be fabricated so that they are straight and do not form a spiral however, and, furthermore, that the grooves can be fabricated with any degree of spiral.

While the preferred embodiment depicted in FIG. 1 illustrates grooves 50 fabricated through rolling, those skilled in the art will appreciate that a groove or grooves may be fabricated in other ways. The grooves of the present invention are not limited to fabrication through rolling. As used herein, a groove is any structure which allows for fluid flow on a connector surface.

After a plurality of grooves 50 have been impressed into the surface, threads are formed on the surface of the shaft section 40 through a similar rolling process. In the preferred embodiment, threads are rolled to a depth which is half the depth of the grooves 50.

Those skilled in the art will appreciate that the grooves and the threads can be made through machining or drilling with a different ratio of relative depths. Furthermore, those skilled in the art will appreciate that the present invention can be threaded first and then rolled to form the groove.

The presently preferred embodiment includes a polygonal cap 60 as a torque transferring structure. As used herein, a torque transferring structure is any structure which allows a torque to be transferred to shaft 20 of the present invention. The torque transferring structure 60 is used to rotate the shaft 20 and tighten or loosen the threaded connection between the present invention and another structure. Alternatively, the torque transferring structure is a recessed area 61, such as will fit a screw driver (see FIG. 4).

Those skilled in the art will appreciate that torque may be transferred via any of a plurality of structures and that any such structure can be used without departing from the spirit of the present invention. Any structure which allows a torque to be transferred to the shaft 20 of the present invention is a torque transferring structure within the scope of the present invention.

Figure 3:
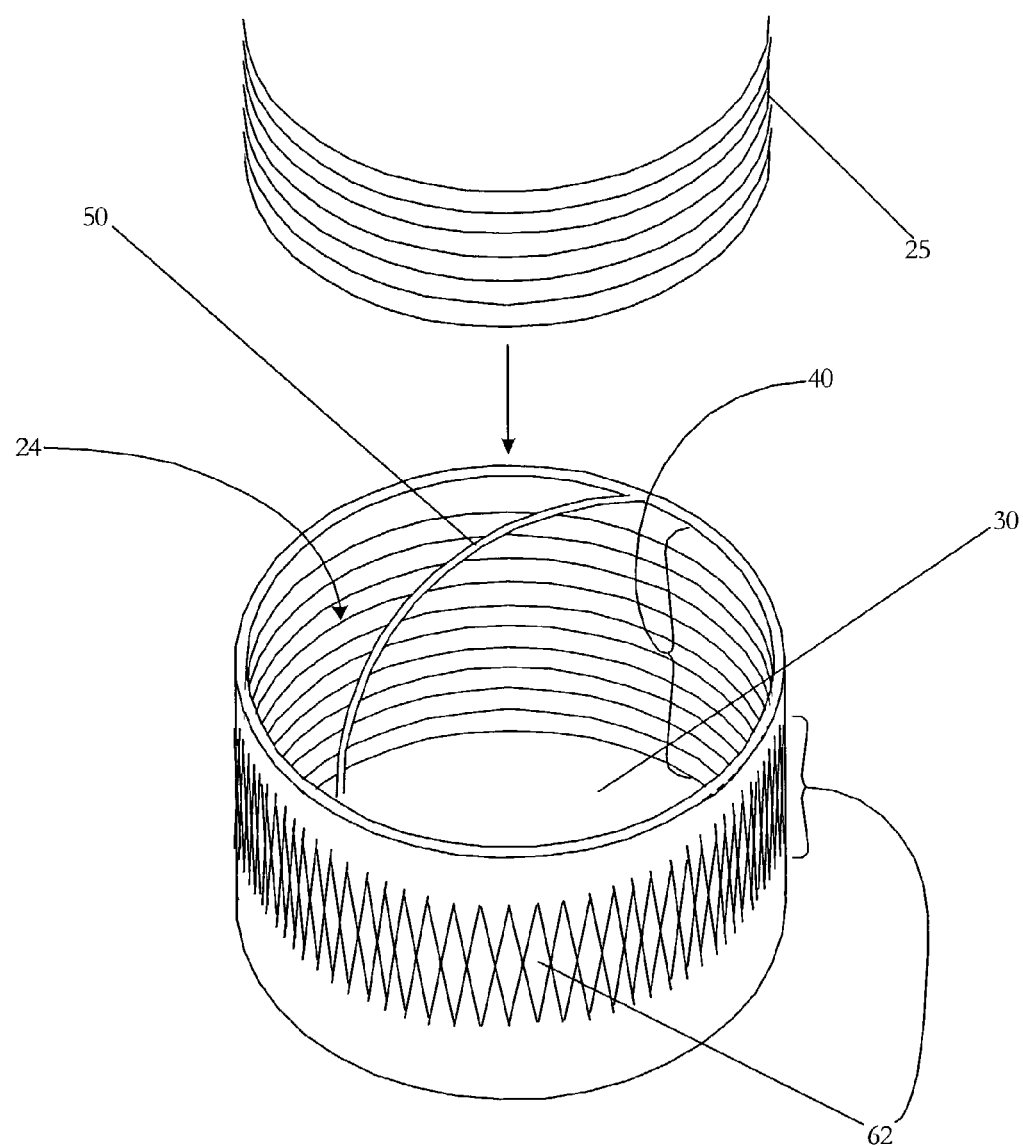
FIG. 3 depicts an alternative embodiment of a fluid connector.
Figure 4:
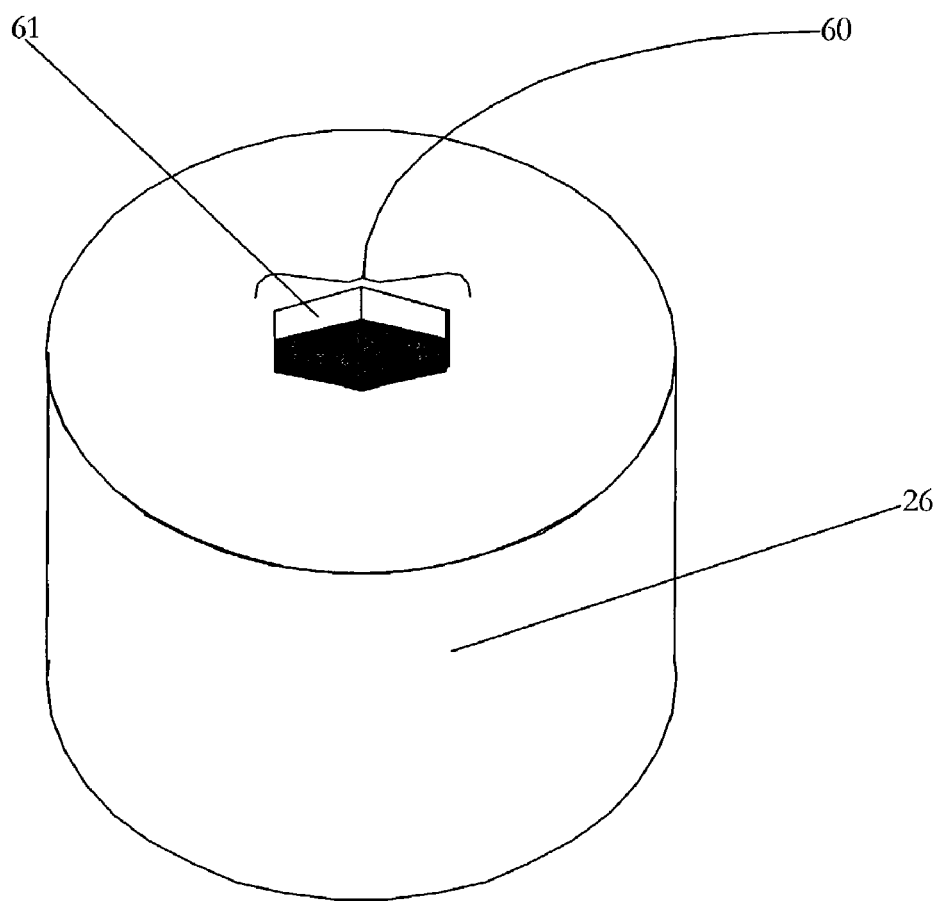
FIG. 4 depicts a view of the outside of a second embodiment of a fluid connector.

FIG. 3 depicts the hollow shaft element of an alternative embodiment of the present invention. In the alternative embodiment of FIG. 3, a surface with a plurality of threads 40 defines an inner section 24 which accommodates a threaded rod 25. Within the surface with a plurality of threads 40, a groove 50 is provided through which fluid flows. As depicted in FIG. 3, the alternative embodiment is preferably provided with a torque transferring structure 60, which is in the form of a roughened gripping surface 62. However, as noted above, those skilled in the art will appreciate that torque may be transferred through other structures, such as a recessed area 61, as depicted in FIG. 4 and previously discussed. FIG. 4 depicts the outer surface 26 of the hollow shaft element of the alternative embodiment of the present invention with an alternative torque transferring structure 60.

Figure 5:
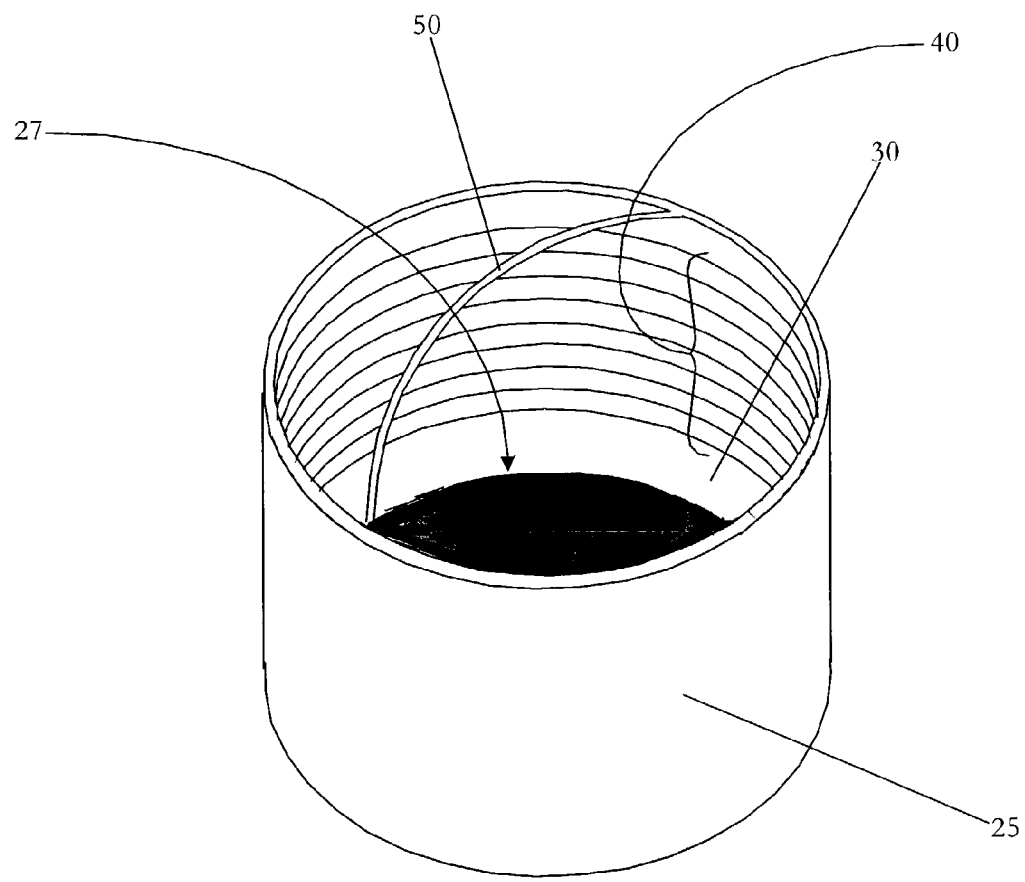
FIG. 5 depicts a third embodiment of a fluid connector.

FIG. 5 depicts a second alternative embodiment of the present invention. As illustrated in FIG. 5, a surface with a plurality of threads 40 defines an inner section 24 which accommodates a threaded rod. Within the surface with a plurality of threads 40, a groove is provided through which fluid flows. In the alternative embodiment depicted in FIG. 5, an opening 27 is provided which accommodates a fluid conveying structure, such as a nozzle (not shown). Those skilled in the art will appreciate that the opening 27 may be defined in the outer surface 26. As illustrated in FIG. 5, the inner section 24 accommodates a threaded rod.

Figure 6:
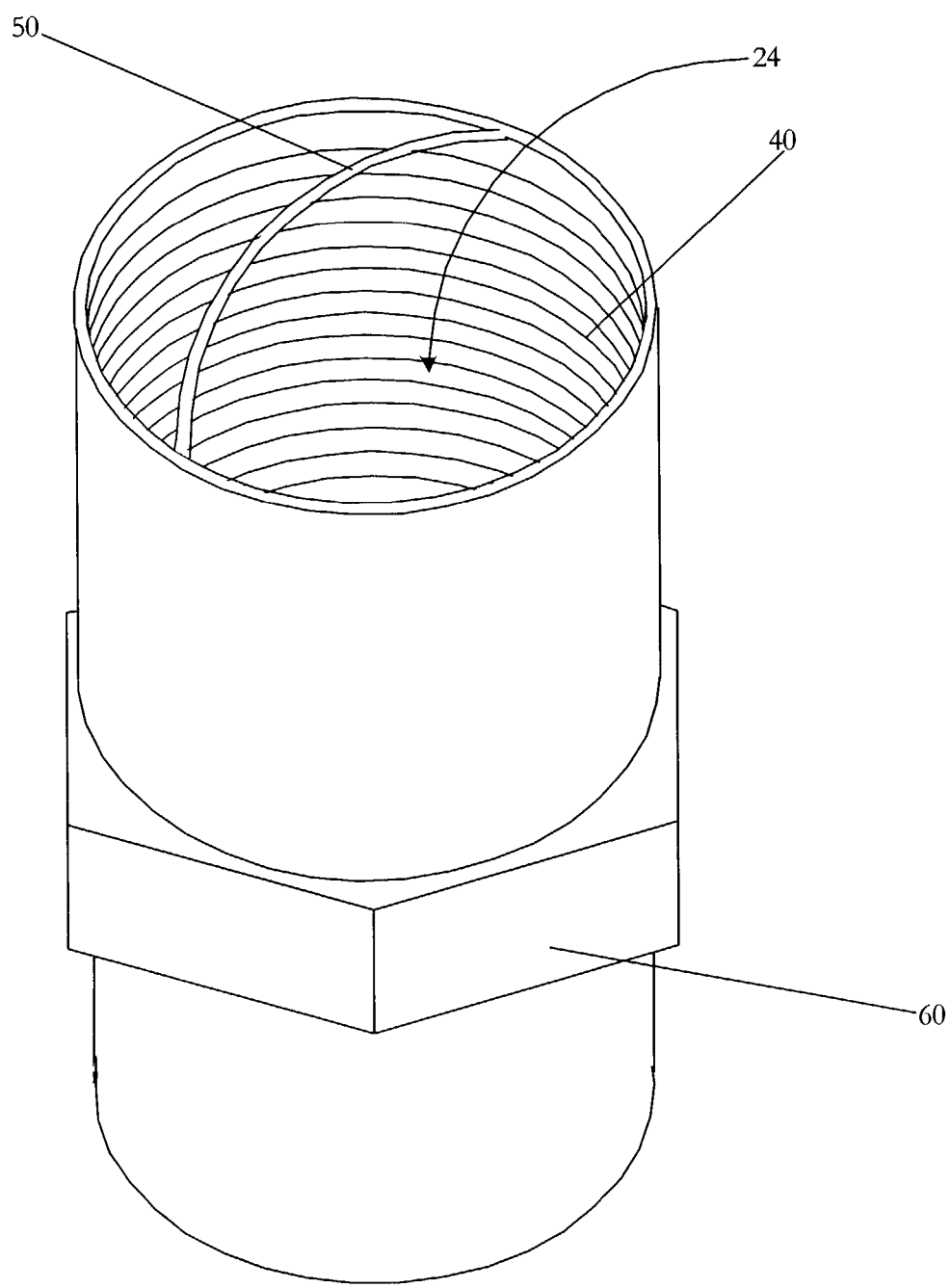
FIG. 6 depicts a fourth embodiment of a fluid connector.

FIG. 6 depicts a third alternative embodiment of the present invention configured as a coupler 11. The coupler 11 depicted in FIG. 6 is composed of an outer surface 26 and a surface with a plurality of threads 40 which defines an inner section 24. The inner section 24 accommodates at least one threaded rod 25, preferably two threaded rods. Within the threaded surface 40, a groove 50 is provided through which fluid flows. As depicted in FIG. 6, the coupler 11 is preferably provided with a torque transferring structure 60.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A flow bolt for conducting fluid from adjacent a bolt head to a free end of a bolt shaft comprising:
   a) an elongated shaft and a torque applying head, the head being formed unitarily with the shaft on one end of the shaft;
   b) the shaft including a plurality of shaft sections between the head and the free end of the shaft and being substantially solid along its entire length;
   c) a first one of the sections comprising an externally threaded section adjacent the free end of the shaft;
   d) a second one of the sections comprising an unthreaded cylindrical section with a smooth outer surface between the threaded section and the head;
   e) a plurality of longitudinally extending grooves formed into the threads of the threaded section and into the outer surface of the cylindrical second section;
   f) the plurality of shaft sections includes a third unthreaded section between the second unthreaded section and the head; and
   g) the third unthreaded section being disposed immediately adjacent the head and having a smooth cylindrical surface with a diameter greater than the diameter of the cylindrical second shaft section.

2. The flow bolt of claim 1 further characterized in that:
   a) the plurality of shaft sections include a fourth unthreaded section between the second and the third unthreaded sections;
   b) the fourth shaft section comprising a generally frusto-conical section; and
   c) the grooves extending into immediately adjacent relationship with the frusto-conical section.

3. The flow bolt of claim 1 further characterized in that the threads are provided with a thread depth and the grooves are provided with a groove depth, wherein the thread depth is at least half that of the groove depth.

4. The flow bolt of claim 1 further characterized in that the shaft is fabricated at least in part through hot forming.

5. The flow bolt of claim 1 further characterized in that the shaft is fabricated at least in part through machining.

6. The flow bolt of claim 1 further comprising means for cold forming the flow bolt.

7. The flow bolt of claim further characterized in that the grooves are provided with a spiral shape.

8. The flow bolt of claim 1 further characterized in that the grooves are equally spaced from each other.

9. The flow bolt of claim 1 wherein the grooves are fabricated through cold heading.

10. The flow bolt of claim 1 wherein the grooves and the shaft are fabricated through cold heading.

11. A flow bolt for conducting fluid from adjacent a bolt head to a free end of a bolt shaft comprising:

a) an elongated shaft and a torque applying head, the head located adjacent to one end of the shaft;
b) the shaft including a plurality of shaft sections between the head and the free end of the shaft and being substantially solid along its entire length;
c) a first one of the sections comprising an externally threaded section;
d) a second one of the sections located between the threaded section and the head and comprising an unthreaded section with a generally cylindrical outer surface;
e) a plurality of longitudinally extending grooves that extend from the threaded section and into the outer surface of the second section;
f) the plurality of shaft sections includes a third unthreaded section located between the second section and the head;
g) the third unthreaded section provided with a generally cylindrical outer surface with a diameter greater than a diameter of the second shaft section; and
h) wherein at least a portion of the flow bolt is fabricated at least in part through cold forming.

12. The flow bolt of claim 11 further characterized in that the plurality of grooves are impressed into the shaft through cold forming.

13. The flow bolt of claim 11 further characterized in that the grooves are provided with a spiral shape.

14. The flow bolt of claim 11 further characterized in that the threads are provided with a thread depth and the grooves are provided with a groove depth, wherein the thread depth is at least half that of the groove depth.

15. The flow bolt of claim 11 further characterized in that:
a) the plurality of shaft sections include a fourth unthreaded section between the second and the third unthreaded sections; and
b) the fourth shaft section including an outer surface that is generally frusto-conical in shape.

16. The flow bolt of claim 11 wherein the grooves are fabricated through cold heading.

17. The flow bolt of claim 11 wherein the grooves and the shaft are fabricated through cold heading.

18. A flow bolt for conducting fluid from adjacent a bolt head to a free end of a bolt shaft comprising:
a) an elongated shaft and a torque applying head, the head located adjacent to one end of the shaft;
b) the shaft including a plurality of shaft sections between the head and the free end of the shaft and being substantially solid along its entire length;
c) a first one of the sections comprising an externally threaded section;
d) a second one of the sections located between the threaded section and the head and comprising an unthreaded section with a generally cylindrical outer surface;
e) a plurality of longitudinally extending grooves that extend from the threaded section and into the outer surface of the second section;
f) the plurality of shaft sections includes a third unthreaded section located between the second unthreaded section and the head;
g) the third unthreaded section provided with a generally cylindrical outer surface with a diameter greater than a diameter of the second shaft section; and
h) wherein at least a portion of the flow bolt is fabricated at least in part through rolling.

19. The flow bolt of claim 18 further characterized in that at least a portion of the flow bolt is fabricated at least in part through cold forming.

20. The flow bolt of claim 18 further characterized in that at least a portion of the flow bolt is fabricated at least in part through hot forming.

21. The flow bolt of claim 18 further characterized in that the grooves are provided with a spiral shape.

22. The flow bolt of claim 18 further characterized in that the threads are provided with a thread depth and the grooves are provided with a groove depth, wherein the thread depth is at least half that of the groove depth.

23. The flow bolt of claim 18 further characterized in that:
a) the plurality of shaft sections include a fourth unthreaded section between the second and the third unthreaded sections; and
b) the fourth shaft section including an outer surface that is generally frusto-conical in shape.

24. The flow bolt of claim 18 further characterized in that the grooves are equally spaced from each other.

25. The flow bolt of claim 18 wherein the grooves are fabricated through cold heading.

26. The flow bolt of claim 18 wherein the grooves and the shaft are fabricated through cold heading.

* * * * *